(12) United States Patent  
Kadoya

(10) Patent No.: US 7,187,703 B2  
(45) Date of Patent: Mar. 6, 2007

(54) INTRACAVITY SUM-FREQUENCY MIXING LASER

(75) Inventor: Minoru Kadoya, Yokohama (JP)

(73) Assignee: Showa Optronics Co., Ltd., Tokyo (JP)

( * ) Notice: Subject to any disclaimer, the term of this patent is extended or adjusted under 35 U.S.C. 154(b) by 285 days.

(21) Appl. No.: 10/950,585

(22) Filed: Sep. 28, 2004

(65) Prior Publication Data

US 2006/0045161 A1    Mar. 2, 2006

(30) Foreign Application Priority Data

Aug. 24, 2004   (JP) .............................. 2004-243827

(51) Int. Cl.  
*H01S 3/091* (2006.01)

(52) U.S. Cl. .......................................... 372/70; 372/71

(58) Field of Classification Search ................ 372/70, 372/69, 71, 20, 22  
See application file for complete search history.

(56) References Cited

U.S. PATENT DOCUMENTS

| 5,263,037 A | * | 11/1993 | Trutna et al. .................. 372/20 |
| 5,263,038 A | * | 11/1993 | Lukas et al. ................... 372/22 |
| 5,345,457 A |   | 9/1994  | Zenzie et al. |
| 5,802,086 A |   | 9/1998  | Hargis et al. |
| 6,201,638 B1 | * | 3/2001 | Hall et al. .................... 359/346 |

OTHER PUBLICATIONS

"Efficient direct frequency doubling of an extended-vertical-cavity surface-emitting laser diode using a periodically-poled KTP crystal." Optical Society of America, 2002. Rafailov, et al.

* cited by examiner

*Primary Examiner*—Minsun Oh Harvey  
*Assistant Examiner*—Tuan N. Nguyen  
(74) *Attorney, Agent, or Firm*—Pearl Cohen Zedek Latzer, LLP

(57) ABSTRACT

Provided is a diode-pumped solid-state laser adapted for an intracavity sum-frequency mixing for generating a laser radiation of a visible wavelength range by performing a sum-frequency mixing of two laser inputs in a laser resonant cavity. A pair of laser resonators of two different wavelengths are formed along a common optical path and an intracavity sum-frequency mixing is conducted so as to obtain a laser radiation at a sum-frequency wavelength by placing a nonlinear optical crystal on this common optical path. By suitably selecting the properties of the reflective surfaces that form the laser resonators, a laser radiation of a relatively short wavelength range can be obtained even though the wavelength of the pumping laser beam is relatively long, and an extremely high conversion efficiency can be achieved.

12 Claims, 2 Drawing Sheets

INTRACAVITY SUM-FREQUENCY MIXING LASER

PRIOR APPLICATION DATA

The present application claims priority from prior Japanese application 2004-243827, filed on Aug. 24, 2004, incorporated by reference in its entirety.

TECHNICAL FIELD

The present invention relates to a diode-pumped solid-state laser that converts the wavelength of a laser output by using a nonlinear optical crystal. In particular, the present invention relates to an intracavity sum-frequency mixing laser that generates a laser radiation of a visible wavelength range by performing a sum-frequency mixing of two laser inputs in a laser resonant cavity.

BACKGROUND OF THE INVENTION

The visible-light lasers of small outputs in the range of 1 mW to 100 mW have been rapidly replaced from gas lasers to laser diodes and diode-pumped solid-state lasers over the past ten years. GaInN/GaN diode lasers are preferred in the wavelength range of 400 nm to 440 nm, and AlGaInP/GaAs diode lasers are preferred in the wavelength range longer than 630 nm.

As a type of lasers that fills the gap between these wavelength ranges is known the diode-pumped solid-state laser that converts the near-infrared laser output from a laser diode to a visible-light laser radiation by performing an intracavity frequency doubling. The materials for use as the laser crystals for such lasers are listed in the following along with the corresponding wavelengths before and after the frequency doubling.

TABLE 1

| materials for the laser crystal | wavelengths before and after conversion |
| --- | --- |
| Nd:YVO$_4$ | 914 nm → 457 nm |
| Nd:YAG | 946 nm → 473 nm |
| Nd:YLF | 1,047 nm → 523 nm |
| Nd:YAG | 1,064 nm → 532 nm |
| Nd:YVO$_4$ | 1,064 nm → 532 nm |
| Nd:YAG | 1,112 nm → 556 nm |

These diode-pumped solid-state lasers that involve the intracavity frequency doubling can provide wavelengths that are not available from laser diodes. However, there still are large gaps near the wavelengths of 500 nm and 590 nm. Attempts to generate laser radiation in these wavelengths are disclosed in the U.S. Pat. Nos. 5,345,457 and 5,802,086 and Conference on Laser and Electro-Optics 2003, CWC6, "Efficient direct frequency doubling of an extended-vertical cavity surface-emitting laser diode using a periodically-poled KTP crystal".

The last mentioned technical paper discloses an arrangement for generating a laser radiation at a wavelength of 489 nm by an intracavity frequency doubling. In this arrangement, a mirror at the output end of a surface-emitting laser diode is provided outside the laser diode, and a laser resonance cavity is defined between the laser diode and the mirror to produce a laser radiation at a wavelength of 980 nm. A nonlinear optical element placed in the laser resonance cavity generates a laser radiation at a wavelength of 489 nm by an intracavity frequency doubling.

U.S. Pat. No. 5,345,457 discloses an intracavity sum-frequency mixing laser using a pair of Nd:YAG crystals from which laser radiations at wavelengths of 1,064 nm and 1,318 nm are produced, and a laser radiation at a wavelengths of 589 nm is produced by performing a sum-frequency mixing in a nonlinear optical crystal placed in an optical path common to the two Nd:YAG crystals. The optical resonator is bifurcated, and the two Nd:YAG crystals are placed in the two separate arms of the bifurcated resonator to be pumped by separate flash lamps, respectively.

U.S. Pat. No. 5,802,086 discloses an intracavity sum-frequency mixing laser using a single Nd:YAG crystal and a single laser diode to pump the laser crystal. Laser radiations at two different wavelengths of 1,064 nm and 1,342 nm are produced at the same time in the same optical resonator, and a laser radiation at a wavelength of 594 nm is produced by performing a sum-frequency mixing in a nonlinear optical crystal placed in the optical resonator.

The laser disclosed in the aforementioned technical paper that is based on the intracavity frequency doubling using a surface-emitting laser diode is capable of producing a laser radiation at about a wavelength of 500 nm if the laser diode is configured so as to generate a pumping laser beam at a wavelength of approximately 1,000 nm and a suitable material is selected for the crystal for converting the wavelength. However, because the wavelength of the output laser radiation is dictated by the wavelength of the pumping beam emitted from the laser diode, certain variations in the wavelength of the produced laser radiation is inevitable.

It is also possible to convert the wavelength of the output of a laser diode by using a waveguide type wavelength conversion device, and various such attempts have been made. According to this method, it is possible to convert the output of a laser diode at about a wavelength of 1,000 nm to a laser radiation at about a wavelength of 500 nm. In this case also, certain variations in the wavelength of the produced laser radiation is inevitable for the same reason.

In the intracavity sum-frequency mixing laser disclosed in the U.S. Pat. No. 5,345,457, because the two Nd:YVO$_4$ crystals are placed in the different arms of the bifurcated optical resonator, even when the flash lamps are replaced by laser diodes, it makes no difference in that two separate pumping light sources are required. Also, the fact that the optical resonator has a highly complex structure makes a compact design difficult to achieve and prevents reduction in the manufacturing cost.

In the diode-pumped solid-state laser based on the intracavity sum-frequency mixing disclosed in U.S. Pat. No. 5,802,086, because only one optical crystal and only one laser diode are required, a highly simple and compact design is possible, and the manufacturing cost can be minimized. However, a reflective surface that forms a part of the optical resonator is required to cause a certain amount of loss to the wavelength of 1,064 nm at which the more powerful laser radiation is produced of the two different wavelengths of the laser radiation, and this prevents a high efficiency to be achieved.

BRIEF SUMMARY OF THE INVENTION

A primary object of the present invention is to provide a diode-pumped solid-state laser based on the intracavity sum-frequency mixing that can produce a laser radiation at a wavelength of about 500 nm or 590 nm with minimum variation in the wavelength.

A second object of the present invention is to provide such a laser which is suitable for compact design and economical to manufacture.

Such objects of the present invention can be accomplished by providing a diode-pumped solid-state laser, comprising: a laser optical assembly including at least a first reflective surface, a first laser crystal, a second reflective surface, a second laser crystal, a nonlinear optical crystal and a third reflective surface in that order; a pumping laser diode; and a focusing optical assembly for focusing laser output from the laser diode onto the laser optical assembly; the laser optical assembly defining a first laser resonator defined between the first and third reflective surfaces to generate a laser radiation of a first wavelength by stimulated emission transition in the first laser crystal, and a second laser resonator defined between the second and third reflective surfaces to generate a laser radiation of a second wavelength by stimulated emission transition in the second laser crystal, the second laser crystal being adapted to be pumped by a same wavelength as the first laser crystal and not to effect an absorption transition or stimulated emission transition at the first wavelength; wherein the nonlinear optical crystal is adapted for phase matching so as to generate a laser radiation of a third wavelength by a sum-frequency mixing of the laser radiations of the first and second wavelengths, and the laser output from the laser diode focused onto the laser optical assembly simultaneously pumps both the first laser crystal and second laser crystal from a prescribed direction.

It is known that a Nd:YAG (Nd:$Y_3A_{15}O_{12}$: neodymium-doped yttrium-aluminum-garnet) laser can generate a laser radiation at wavelengths of 946 nm, 1,064 nm and 1,318 nm. It is also known that a Nd:$YVO_4$ (neodymium-doped yttrium orthovanadate) laser can generate a laser radiation at wavelengths of 914 nm, 1,064 nm and 1,342 nm. It can be readily appreciated that a laser radiation at a wavelength of 501 nm can be obtained by performing a sum-frequency mixing of the laser radiations at the wavelengths of 946 nm and 1,064 nm.

It also can be readily appreciated that a laser radiation at a wavelength of 589 nm can be obtained by performing a sum-frequency mixing of the laser radiations at the wavelengths of 1,318 nm and 1,064 nm in a nonlinear optical crystal in a similar manner as in the U.S. Pat. No. 5,345,457. It also can be readily appreciated that a laser radiation at a wavelength of 594 nm can be obtained by performing a sum-frequency mixing of the laser radiations at the wavelengths of 1,064 nm and 1,342 nm in a nonlinear optical crystal in a similar manner as in the U.S. Pat. No. 5,802,086.

In these cases of the sum-frequency mixing, because the two basic wavelengths are generated by the laser transition of a rare earth ion in a crystalline medium, the variation in the wavelength is no more than 0.1 nm in each case. Therefore, the variation of the wavelength of the laser radiation that is obtained by the sum-frequency mixing of these basic wavelengths is also no more than 0.1 nm.

It is thus possible to produce a laser radiation at a wavelength of about 500 nm or 590 nm with minimum variation in the wavelength by using a sum-frequency mixing of the two wavelengths. However, according to the prior art, at least for continuous operation, it was not possible to obtain a laser radiation of a practically adequate power even when lasers having two different wavelengths are used and the outputs of these two lasers are focused upon a nonlinear optical crystal to perform a sum-frequency mixing.

According to a concept of the present invention, an adequate level of efficiency and a practically useful output power can be achieved if a common optical path is provided for two separate laser resonators of two different wavelengths and an intracavity sum-frequency mixing is conducted so as to obtain a laser radiation at a sum-frequency wavelength by placing a nonlinear optical crystal on this common optical path because an extremely high conversion efficiency can be achieved by taking advantage of the fact that the power of the laser radiation in the optical resonator can be raised to a very high level in this case.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
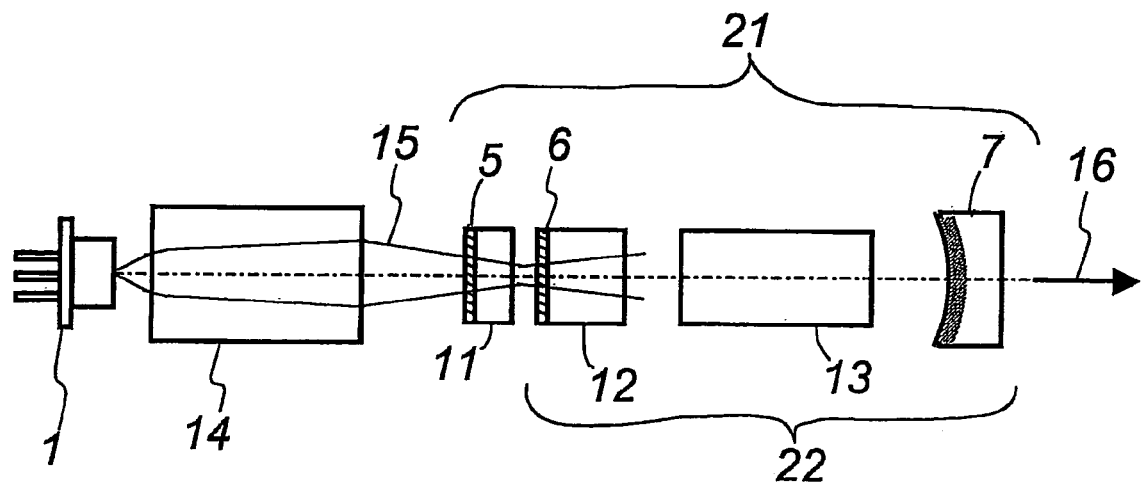
FIG. 1 is a diagram illustrating a first conceptual embodiment of the present invention.

An intracavity sum-frequency mixing laser embodying the present invention is described in the following with reference to FIG. 1.

The illustrated laser include a laser optical assembly essentially consisting of a first reflective surface 5, a first laser crystal 11, a second reflective surface 6, a second laser crystal 12, a nonlinear optical crystal 13 and a third reflective surface 7, arranged in that order along a common optical axial line which is straight in the illustrated embodiment.

The first reflective surface 5 may consist of a multi-layer dielectric film applied to a face of the first laser crystal 11 or may also consist of such a film applied to a separate glass or crystal plate. In the latter case, the glass or crystal plate may not necessary be attached to or placed close to the first laser crystal 11, but may be spaced from the first laser crystal 11.

The second reflective surface 6 may consist of a multi-layer dielectric film applied to a face of the second laser crystal 12 or may also consist of such a film applied to a separate glass or crystal plate. In the latter case, the glass or crystal plate may not necessary be attached to or placed close to the second laser crystal 12, but may be spaced from the second laser crystal 12.

The first laser crystal 11 is adapted to generate a laser radiation at a first wavelength, and the second laser crystal 12 is adapted to generate a laser radiation at a second wavelength which is different from the first wavelength. The first, second and third reflective surfaces 5, 6 and 7 are given with selective reflective properties as summarized in Table 2.

TABLE 2

|  | 1st reflective surface | 2nd reflective surface | 3rd reflective surface |
| --- | --- | --- | --- |
| 1st wavelength | HR | AR | HR |
| 2nd wavelength | AR | HR | HR |
| 3rd wavelength | HR | AR | AR |
| pumping wavelength | AR | AR | — |
| unwanted emissive transition wavelength | AR | AR | AR | where HR represents high reflectivity, and AR low reflectivity.

The third reflective surface 7 is configured as a concave surface having a curvature that allows stable resonators to be formed in cooperation with the first reflective surface 5 and second reflective surface 6, respectively.

A first laser resonator 21 for generating a laser radiation at a first wavelength is formed between the first reflective surface 5 and third reflective surface 7 by using a stimulated emissive transition in the first laser crystal 11, and a second laser resonator 22 for generating a laser radiation at a second wavelength is formed between the second reflective surface 6 and third reflective surface 7 by using a stimulated emissive transition in the second laser crystal 12. The nonlinear optical crystal 13 placed on the common optical light path of the two laser resonators 21 and 22 is adapted to generate a laser radiation 16 at a third wavelength by sum-frequency mixing the first and second wavelengths.

The material for the first and second laser crystals 11 and 12 should meet the following conditions in addition to being suitable for generating a laser radiation at the wavelength required for achieving a desired wavelength by sum-frequency mixing.

Firstly, the material for the first and second laser crystals 11 and 12 should be adapted to be pumped by a same wavelength so that both of them may be pumped by sharing a pumping beam from a same laser diode.

Secondly, the material for the second laser crystal should be such that there will be no stimulated emissive transition or absorption transition at the first wavelength although the material for the first laser crystal may be such that a stimulated emissive transition at the second wavelength could be caused. If the second laser crystal is capable of an absorption transition at the first wavelength, the second laser crystal will cause a loss to the first resonator 21 for the first wavelength formed between the first and third reflective surfaces 5 and 7, and this prevents an adequate internal power to be built up in the first resonator 21 for a satisfactory sum-frequency mixing to take place. Also, if the second laser crystal is capable of a stimulated emissive transition at the first wavelength, as the laser radiation at the first wavelength passes through the second laser crystal 12, a stimulated emissive transition occurs in the second laser crystal 12 at the first wavelength and this significantly reduces or totally prevents a stimulated emission transition at the second wavelength. This prevents an adequate internal power to be built up in the second resonator 22 for a satisfactory sum-frequency mixing to take place.

Thirdly, it is necessary for both or one of the first and second laser crystals 11 and 12 to have a sufficiently large coefficient of absorption so that most or more than 80% of the pumping laser beam may be absorbed by a combined length of the two crystals which is in the order of 1 mm to 3 mm.

The laser diode 1 emits a laser beam that has a wavelength capable of pumping both the first and second laser crystals 11 and 12. The pumping beam 15 from the laser diode 1 is focused by a focusing optical system 14, and pumps both the first and second laser crystals 11 and 12 that are aligned on a common optical axis from a same direction. The first laser crystal 11 absorbs a part of the pumping beam 15, and the second laser crystal 12 absorbs the remaining part of the pumping beam 15. The distribution ratio of the pumping beam 15 between the first and second laser crystals 11 and 12 can be determined by suitably selecting the thickness of the first laser crystal 11.

Because the first and second laser crystals 11 and 12 are both required to be at a position on which the pumping beam 15 from the single laser diode 11 is focused by the focusing optical system 14, the two laser crystals 11 and 12 are required to be closely in contact with each other or closely located with a small clearance, for instance in the order or 0.5 mm or less, between them.

The second reflective surface 6 is provided on the face of the second laser crystal 12 facing the first laser crystal 11 in the embodiment illustrated in FIG. 1, and this requires the optical adjustment of both the relationship between the first and third reflective surfaces 5 and 7 and the relationship between the second and third reflective surfaces 6 and 7. Therefore, the orientation of at least one of the first and second reflective surfaces 5 and 6 is required to be adjusted in addition to the position and orientation of the third reflective surface 7.

Figure 2:
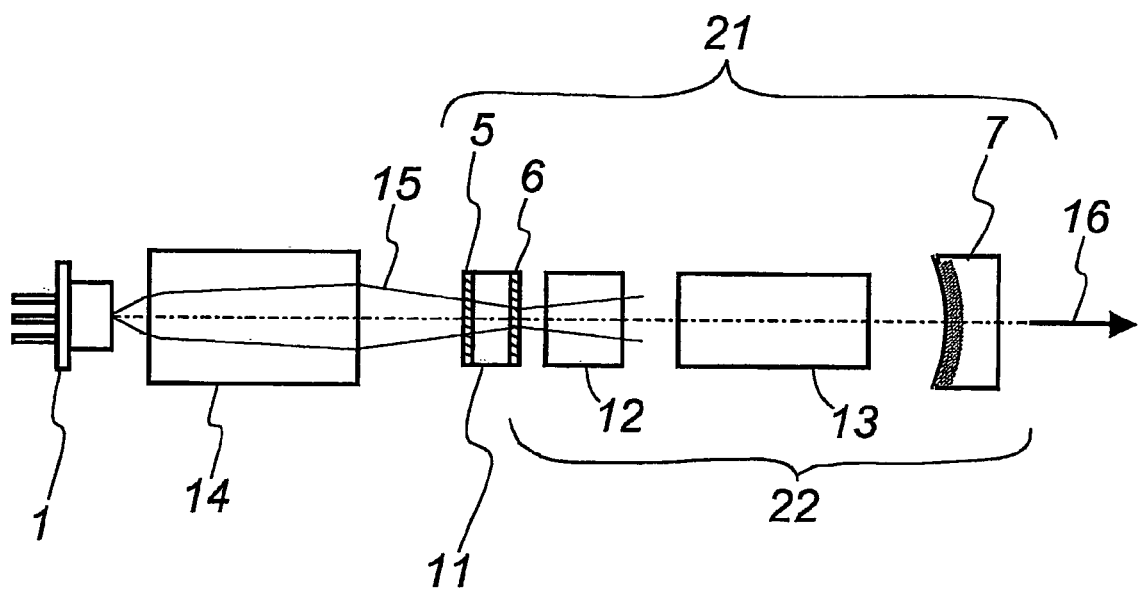
FIG. 2 is a diagram illustrating a second conceptual embodiment of the present invention.

FIG. 2 shows an embodiment that will simplify such an optical adjustment. The parts corresponding to those of the previous embodiment are denoted with like numerals without repeating the description of such parts. The opposing faces of the first laser crystal 11 are finished so as to be precisely parallel to each other, and the first and second reflective surfaces 5 and 6 are formed on the opposing faces, respectively. In this case also, the selective reflective property of the second reflective surface 6 should be as listed in Table 2. Thereby, even when there is some tilting between the optical axial lines of the first and second laser crystals 11 and 12, a required optical adjustment can be accomplished simply by adjusting the relative position between the first laser crystal 11 and the third reflective surface 7.

All the elements were arranged on a straight linear path in the embodiment illustrated in FIGS. 1 and 2, but the optical path may be bent or curved as desired by suitably changing the direction of the optical path by placing reflective devices in the optical path without departing from the spirit of the present invention. Also, the sum-frequency mixed laser radiation 16 may be obtained from a point other than the third reflective surface 7. For instance, a fourth reflective surface may be interposed between the second laser crystal 12 and the nonlinear optical crystal 13 so that both the first and second resonators to be formed each as a V-shaped resonator, and obtain the sum-frequency mixed laser radiation from the fourth reflective surface.

Also, the first and second laser crystals 11 and 12 were pumped from the side of the first laser crystal 11 in the foregoing embodiments, but may also be pumped from the opposite side by similarly using a single pumping source.

As can be appreciated from the foregoing embodiments, the present invention can provide a laser that can generate a laser radiation at wavelengths near about 500 nm or 590 nm, which have been difficult to obtain by using a laser diode or by intracavity frequency doubling in a semiconductor-pumped solid-state laser, by means of a compact and economical design while minimizing wavelength variations.

Figure 3:
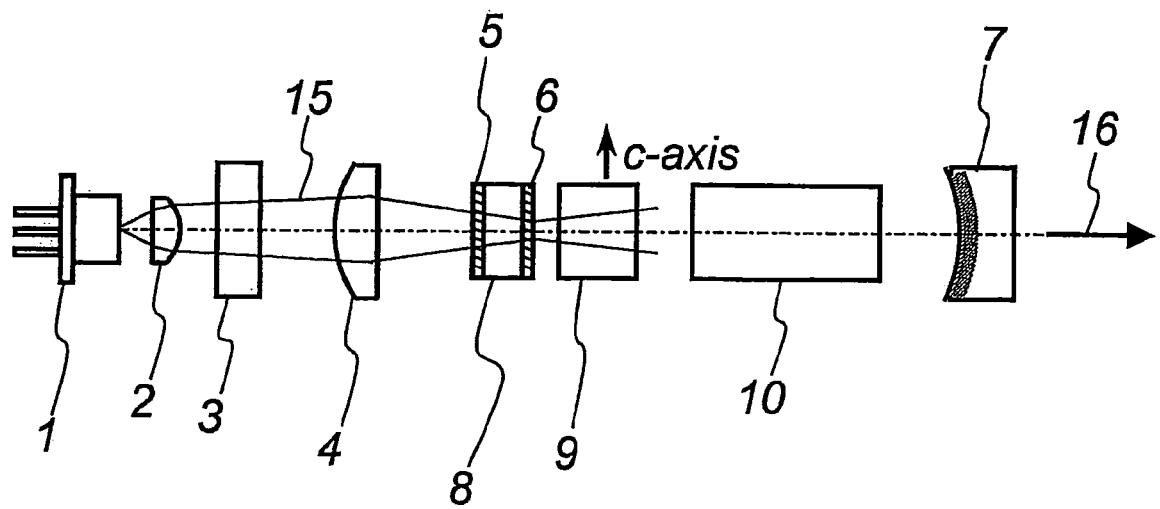
FIG. 3 is a diagram illustrating a first concrete embodiment of the present invention.

FIG. 3 shows a concrete or practical embodiment (first concrete embodiment) of the present invention. The laser diode 1 which may also consist of other forms of semiconductor lasers has an active aperture width of 100 μm, and emits a laser beam at a wavelength of 808 nm with an output power of 2 W. The emitted laser beam is in the TE mode in which the direction of the electric field of the output beam is in parallel with the junction surface, and the electric field of the output beam extends in parallel with the plane of the paper of the drawing. The output beam of this laser diode 1 provides a pumping beam 15 for pumping laser crystals. The pumping beam 15 is focused by a focusing optical system including a lens 2, a first cylindrical lens 3 and a second cylindrical lens 4.

The lens 2 consists of an aspherical lens having a focal distance of 8 mm, and reduces the divergent angle of the pumping beam 15 as it is emitted from the laser diode 1. The first cylindrical lens 3 has a focal distance of 19 mm, and converges the pumping beam 15 in a plane perpendicular to the plane of the paper. The second cylindrical lens 4 has a focal distance of 7.7 mm, and converges the pumping beam 15 in a plane parallel to the plane of the paper. By suitably adjusting the positions of these lenses 2, 3, and 4, the pumping beam 15 is focused at a point approximately 32 mm from the laser diode 1, and the cross sectional area of the pumping beam 15 is less than 0.2 mm by 0.2 mm along a length of approximately 2 mm near this focused point.

Referring to FIG. 3, the laser optical system includes a first reflective surface 5, a Nd:YAG ((Nd:Y$_3$A$_{15}$O$_{12}$: neodymium-doped yttrium-aluminum-garnet) crystal (first laser crystal) 8, a second reflective surface 6, a Nd:YVO$_4$ (neodymium-doped yttrium orthovanadate) crystal (second laser crystal) 9, a KTP crystal 10 and a third reflective surface 7 in that order as seen in the direction of travel of the pumping beam 15. The Nd:YAG crystal 8 and Nd:YVO$_4$ crystal 9 are placed at points where the pumping beam 15 converges to small cross sectional areas.

The Nd:YAG crystal 8 includes a neodymium ion at a concentration of 1 atomic %, and has an optical axial length of 1.5 mm. The absorption coefficient of the Nd:YAG crystal 8 is approximately 6 cm$^{-1}$ with respect to the pumping beam 15 at a wavelength of 808 nm. Therefore, the Nd:YAG crystal 8 absorbs approximately 60% of the incident pumping beam 15. Nd:YAG is capable of generating a laser radiation at wavelengths of 946 nm, 1,064 nm and 1,318 nm, but the Nd:YAG crystal 8 of this embodiment is made to generate a laser radiation only at the wavelength of 946 nm by suitably providing a selectively reflective property to the reflecting surfaces. Because Nd:YAG is an isotropic crystal, the electric field of the generated laser radiation contains both a vector that is in parallel with the plane of the paper and a vector that is perpendicular to the plane of the paper.

The first reflective surface 5 is formed by applying a multi-layer dielectric film on the face of the Nd:YAG crystal 8 from which the pumping beam from the laser diode 1 first enters the Nd:YAG crystal 8. The second reflective surface 6 is formed by applying a multi-layer dielectric film on the face of the Nd:YAG crystal 8 opposite to the first reflective surface 5.

The Nd:YVO$_4$ (neodymium-doped yttrium orthovanadate) crystal (second laser crystal) 9 an a a-axis cut crystal that includes a neodymium ion at a concentration of 1 atomic %, and has an optical axial length of 1.0 mm. Nd:YVO$_4$ is capable of generating a laser radiation at wavelengths of 914 nm, 1,064 nm and 1,342 nm, but the Nd:YVO$_4$ crystal 9 of this embodiment is made to generate a laser radiation only at the wavelength of 1,064 nm by suitably providing a selectively reflective property to the reflecting surfaces. The Nd:YVO$_4$ crystal 9 is oriented in such a manner that the c-axis thereof extends in parallel with the electric field vector of the pumping beam 15. The absorption coefficient of the Nd:YVO$_4$ crystal 9 is approximately 30 cm$^{-1}$ with respect to the pumping beam 15 at a wavelength of 808 nm. The Nd:YVO$_4$ crystal 9 absorbs approximately 95% of what is left of the incident pumping beam 15 after being absorbed in the Nd:YAG crystal 8. Because the Nd:YVO$_4$ crystal 9 is cut along the a-axis and generates a laser radiation as $\pi$ polarized light where the electric field vector is in parallel with the c-axis, the electric field vector of the generated laser radiation in this embodiment extends in parallel with the plane of the paper.

Because the Nd:YVO$_4$ crystal (second laser crystal) 9 is not subject to a stimulated emissive transition or absorption transition with respect to the first wavelength of 946 nm, it would not prevent generation of a laser radiation at the first wavelength of 946 nm, and the first wavelength of 946 nm would not prevent generation of a laser radiation at the second wavelength of 1,064 nm.

The third reflective surface 7 is formed by applying a multi-layer dielectric film to a concave surface of quartz glass having a radius of curvature of 100 mm. The distance between the first and third reflective surfaces 5 and 7 is approximately 20 mm, and the distance between the second and third reflective surfaces 6 and 7 is approximately 18 mm.

The first, second and third reflective surfaces 5, 6 and 7 are given with selective reflective properties as summarized in Table 3.

TABLE 3

| | 1st reflective surface | 2nd reflective surface | 3rd reflective surface |
|---|---|---|---|
| 1st wavelength: 946 nm | HR | AR | HR |
| 2nd wavelength: 1,064 nm | AR | HR | HR |
| 3rd wavelength: 501 nm | HR | AR | AR |
| pumping wavelength: 808 nm | AR | AR | — |
| unwanted emissive transition wavelength: 1.3 µm | AR | AR | AR | where HR represents high reflectivity, and AR low reflectivity.

The first and third reflective surfaces 5 and 7 demonstrate a high reflectivity of 99.5% or greater at the wavelength of 946 nm, and a first laser resonator is formed between these two reflective surfaces for generating a laser radiation at the first wavelength of 946 nm by using the stimulated emission transition in the Nd:YAG crystal 8. The second and third reflective surfaces 6 and 7 demonstrate a high reflectivity of 99.5% or greater at the wavelength of 1,064 nm, and a second laser resonator is formed between these two reflective surfaces for generating a laser radiation at the second wavelength of 1,064 nm by using the stimulated emission transition in the Nd:YVO$_4$ crystal 9. In each of the resonators, the TEM$_{00}$ mode diameter is approximately 0.2 mm.

The Nd:YAG crystal 8 is subject to more intense simulated emission at the wavelength of 1,064 nm than at the wavelength of 946 nm, and can generate a laser radiation at the wavelength of 1,064 nm relatively more easily. To suppress laser radiation in the Nd:YAG crystal 8 at this wavelength, the reflective coefficient of the first reflective surface 5 at the wavelength of 1,064 nm is made to be low, preferably 50% or less.

The Nd:YAG crystal 8 and Nd:YVO$_4$ crystal 9 are able to generate a laser radiation at the wavelengths of 1,318 nm and 1,342 nm. Therefore, to suppress generation of a laser radiation at such wavelengths, the reflective coefficients of the first, second and third reflective surfaces 5, 6 and 7 at the wavelength of 1.3 µm is made to be 50% or less.

To facilitate optical adjustment, the two opposing surfaces of the Nd:YAG crystal 8 on which the first and second reflective surfaces 5 and 6 are formed by multi-layer dielectric films are made to be parallel to each other with a precision of 15 seconds or less. Thereby, both the first resonator formed between the third reflective surface 7 and first reflective surface 5 and the second resonator formed between the third reflective surface 7 and second reflective surface 6 can be optically adjusted simultaneously simply by adjusting only the third reflective surface 7.

The KTP crystal 10 interposed between the Nd:YVO$_4$ crystal 9 and third reflective surface 7 has a length of 5 mm as measured along the optical axial line, and has a crystal orientation of (θ, φ)=(90°, 45°). The KTP crystal 10 is adapted for a phase matching that is required for a sum-frequency mixing of the laser radiation at the wavelength of 946 nm having an electric field vector extending in parallel with the c-axis of the KTP crystal 10 and the laser radiation at the wavelength of 1,064 nm having an electric field vector extending in parallel with the x-y surface of the KTP crystal 10 to generate a laser radiation at a wavelength of 501 nm.

The x-y surface of the KTP crystal 10 is oriented in parallel with the c-axis of the Nd:YVO$_4$ crystal 9 so that the phase matching for the required sum-frequency mixing may be achieved.

When a nonlinear optical crystal is placed on the common optical path of the two resonators for the wavelengths of 946 nm and 1,064 nm, the sum-frequency mixed laser radiation propagates in the two directions along the optical path. The sum-frequency mixed laser radiation that is directed toward the third reflective surface 7 passes through the third reflective surface 7 that demonstrates a low reflective coefficient to the laser radiation at the wavelength of 501 nm, and is taken out as a part of the laser radiation output 16. The sum-frequency mixed laser radiation that is directed toward the Nd:YVO$_4$ crystal 9 is reflected by the first reflective surface 5 that demonstrates a high reflective coefficient to the laser radiation at the wavelength of 501 nm, and provides the rest of the laser radiation output 16 after passing through the third reflective surface 7.

In the foregoing embodiment, when the output power of the laser diode was 1.5 W, a laser radiation output 16 of 10 mW at a wavelength of 501 nm in the TEM$_{00}$ mode was obtained. When the output power of the laser diode was 2 W, a laser radiation output 16 of 30 mW was obtained, however, in the multi-traverse mode.

Another practical embodiment (second concrete embodiment) is described in the following again with reference to FIG. 3. This embodiment is not different from the previous embodiment as far as the essential arrangement is concerned and the same drawing is used for the illustration of the description, but differs from the first embodiment in the following respects. The first, second and third reflective surfaces 5, 6 and 7 are given with selective reflective properties as summarized in Table 4.

TABLE 4

| | 1st reflective surface | 2nd reflective surface | 3rd reflective surface |
|---|---|---|---|
| 1st wavelength: 1,318 nm | HR | AR | HR |
| 2nd wavelength: 1,064 nm | AR | HR | HR |
| 3rd wavelength: 589 nm | HR | AR | AR |
| pumping wavelength: 808 nm | AR | AR | — | where HR represents high reflectivity, and AR low reflectivity.

By thus selecting the selective reflective properties of the reflective surfaces, a first resonator is formed between the first and third reflective surfaces 5 and 7 to generate a laser radiation at the first wavelength of 1,318 nm by using the stimulated emissive transition at 1,318 nm in the Nd:YAG crystal 8. Similarly, a second resonator is formed between the second and third reflective surfaces 6 and 7 to generate a laser radiation at the second wavelength of 1,064 nm by using the stimulated emissive transition at 1,064 nm in the Nd:YVO$_4$ crystal 9. Because the Nd:YVO$_4$ crystal (second laser crystal) 9 is not subject to a stimulated emissive transition or absorption transition with respect to the first wavelength (1,318 nm), it would not prevent generation of a laser radiation at the first wavelength (1,318 nm), and the first wavelength (1,318 nm) would not prevent generation of a laser radiation at the second wavelength (1,064 nm).

The second embodiment differs from the first embodiment also in that the KTP crystal 10 has a crystal orientation of (θ, φ)=(79.5°, 0°) which enables a sum-frequency mixing of the laser radiations of the two basic wavelengths of 1,318 nm and 1,064 nm, and that the x-y plane of the KTP crystal 10 is oriented so as to be perpendicular to the c-axis of the Nd:YVO$_4$ crystal 9.

Figure 4:
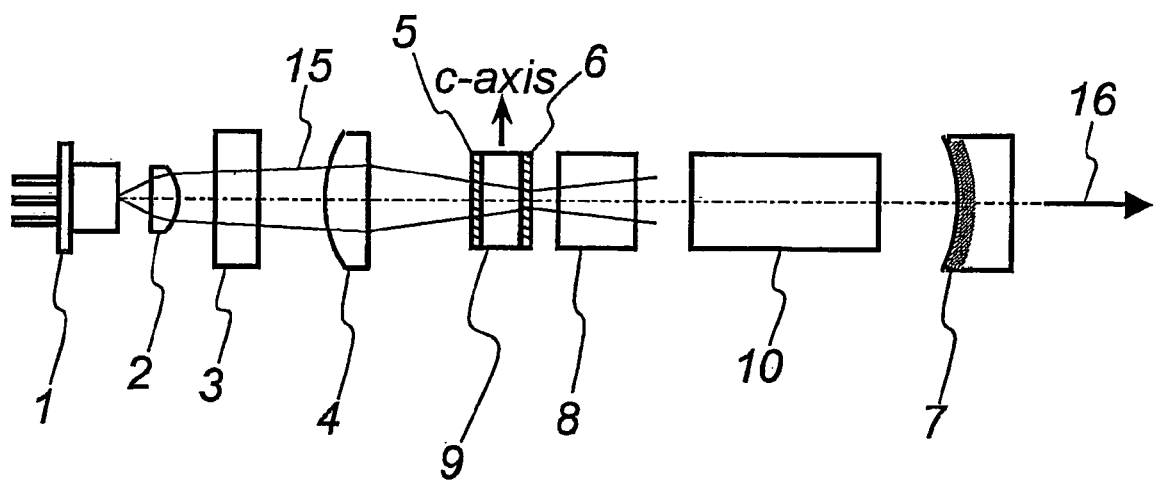
FIG. 4 is a diagram illustrating a second concrete embodiment of the present invention.

Yet another practical embodiment (third concrete embodiment) of the present invention is now described in the following with reference to FIG. 4. The third embodiment is not different from the first and second embodiments as far as the essential arrangement is concerned, but differs from the first and second embodiments in the following respects. The parts corresponding to the previous embodiment are denoted with like numerals without repeating the description of such parts.

Firstly, the Nd:YAG crystal 8 and Nd:YVO$_4$ crystal 9 are transposed with each other, and the length of the Nd:YVO$_4$ crystal 9 measured along the optical axial line is 0.3 mm while that of the Nd:YAG crystal 8 is 2 mm. Thereby, approximately 60% of the pumping beam 15 is absorbed by the Nd:YVO$_4$ crystal 9, and approximately 70% of what is left of the pumping beam 15 is absorbed by the Nd:YAG crystal 8.

Secondly, the first, second and third reflective surfaces 5, 6 and 7 are given with selective reflective properties as summarized in Table 5.

TABLE 5

| | 1st reflective surface | 2nd reflective surface | 3rd reflective surface |
|---|---|---|---|
| 1st wavelength: 1,342 nm | HR | AR | HR |
| 2nd wavelength: 1,064 nm | AR | HR | HR |
| 3rd wavelength: 584 nm | HR | AR | AR |
| pumping wavelength: 808 nm | AR | AR | — | where HR represents high reflectivity, and AR low reflectivity.

By thus selecting the selective reflective properties of the reflective surfaces, a first resonator is formed between the first and third reflective surfaces 5 and 7 to generate a laser radiation at the first wavelength of 1,342 nm by using the stimulated emissive transition at 1,342 nm in the Nd:YVO$_4$ crystal 9. Similarly, a second resonator is formed between the second and third reflective surfaces 6 and 7 to generate a laser radiation at the second wavelength of 1,064 nm by using the stimulated emissive transition at 1,064 nm in the Nd:YAG crystal 8. Because the Nd:YAG crystal (second laser crystal) 8 is not subject to a stimulated emissive transition or absorption transition with respect to the first wavelength (1,342 nm), it would not prevent generation of laser radiation at the first wavelength (1,342 nm), and the first wavelength (1,342 nm) would not prevent generation of laser radiation at the second wavelength (1,064 nm).

Thirdly, the KTP crystal 10 has a crystal orientation of (θ, φ)=(79.0°, 0°) which enables a sum-frequency mixing of the laser radiations of the two basic wavelengths of 1,342 nm and 1,064 nm, and the x-y plane of the KTP crystal 10 is oriented so as to be perpendicular to the c-axis of the Nd:YVO$_4$ crystal 9. Thereby, a laser radiation output 16 at the wavelength of 594 nm was obtained.

A KTP crystal was used as the nonlinear optical crystal in the foregoing embodiments, but other nonlinear optical crystals such as lithium triborate (LBO or $LiB_3O_5$) may also be used as long as the phase matching for the required sum-frequency mixing can be achieved. Alternatively, similar results can be obtained by using lithium niobate provided with a periodic polarization reversal (periodically poled) structure.

The $Nd:YVO_4$ crystal was used in the first and second concrete embodiments to generate a laser radiation at the second frequency of 1,064 nm, but $Nd:GdVO_4$ (neodymium-doped gadolinium vanadate) may also be used. A $Nd:GdVO_4$ crystal absorbs a pumping beam at a frequency of 808 nm, and the absorption coefficient at this wavelength is greater than that of a $Nd:YVO_4$ crystal. Also, a $Nd:GdVO_4$ crystal demonstrates a stimulated emissive transition at the wavelengths of 1,062 nm and 1,342 nm. Thus, $Nd:YVO_4$ may be substituted with $Nd:GdVO_4$ for a similar effect.

Although the present invention has been described in terms of preferred embodiments thereof, it is obvious to a person skilled in the art that various alterations and modifications are possible without departing from the scope of the present invention which is set forth in the appended claims.

The invention claimed is:

1. A diode-pumped solid-state laser, comprising:
   a laser optical assembly including at least a first reflective surface, a first laser crystal, a second reflective surface, a second laser crystal, a nonlinear optical crystal and a third reflective surface in that order;
   a pumping laser diode; and
   a focusing optical assembly for focusing laser output from the laser diode onto the laser optical assembly;
   the laser optical assembly defining
   a first laser resonator defined between the first and third reflective surfaces to generate a laser radiation of a first wavelength by stimulated emission transition in the first laser crystal, and
   a second laser resonator defined between the second and third reflective surfaces to generate a laser radiation of a second wavelength by stimulated emission transition in the second laser crystal, the second laser crystal being adapted to be pumped by a same wavelength as the first laser crystal and not to effect an absorption transition or stimulated emission transition at the first wavelength;
   wherein the nonlinear optical crystal is adapted for phase matching so as to generate a laser radiation of a third wavelength by a sum-frequency mixing of the laser radiations of the first and second wavelengths, and the laser output from the laser diode focused onto the laser optical assembly simultaneously pumps both the first laser crystal and second laser crystal from a prescribed direction.

2. The diode-pumped solid-state laser according to claim 1, wherein the first reflective surface is defined by a multi-layer dielectric film applied to a face of the first laser crystal.

3. The diode-pumped solid-state laser according to claim 1, wherein the second reflective surface is defined by a multi-layer dielectric film applied to a face of the second laser crystal.

4. The diode-pumped solid-state laser according to claim 1, wherein the first reflective surface and second reflective surfaces are defined by multi-layer dielectric films applied to mutually opposing faces of the first laser crystal.

5. The diode-pumped solid-state laser according to claim 1, wherein the first laser crystal consists of a Nd:YAG crystal for generating a laser radiation at a wavelength of 946 nm and the second laser crystal consists of a $Nd:YVO_4$ crystal for generating a laser radiation at a wavelength of 1,064 nm so that the third wavelength may be approximately 501 nm.

6. The diode-pumped solid-state laser according to claim 1, wherein the first laser crystal consists of a Nd:YAG crystal for generating a laser radiation at a wavelength of 1.318 nm and the second laser crystal consists of a $Nd:YVO_4$ crystal for generating a laser radiation at a wavelength of 1,064 nm so that the third wavelength may be approximately 589 nm.

7. The diode-pumped solid-state laser according to claim 1, wherein the first laser crystal consists of a $Nd:YVO_4$ crystal for generating a laser radiation at a wavelength of 1,342 nm and the second laser crystal consists of a Nd:YAG crystal for generating a laser radiation at a wavelength of 1,064 nm so that the third wavelength may be approximately 594 nm.

8. The diode-pumped solid-state laser according to claim 1, wherein the first laser crystal consists of a Nd:YAG crystal for generating a laser radiation at a wavelength of 946 nm and the second laser crystal consists of a $Nd:GdVO_4$ crystal for generating a laser radiation at a wavelength of 1,064 nm so that the third wavelength may be approximately 501 nm.

9. The diode-pumped solid-state laser according to claim 1, wherein the first laser crystal consists of a Nd:YAG crystal for generating a laser radiation at a wavelength of 1,318 nm and the second laser crystal consists of a $Nd:GdVO_4$ crystal for generating a laser radiation at a wavelength of 1,064 nm so that the third wavelength may be approximately 589 nm.

10. The diode-pumped solid-state laser according to claim 1, wherein the first laser crystal consists of a $Nd:GdVO_4$ crystal for generating a laser radiation at a wavelength of 1,342 nm and the second laser crystal consists of a Nd:YAG crystal for generating a laser radiation at a wavelength of 1,064 nm so that the third wavelength may be approximately 594 nm.

11. The diode-pumped solid-state laser according to claim 1, wherein the nonlinear optical crystal consists of $KTiPO_4$.

12. The diode-pumped solid-state laser according to claim 1, wherein the first and second resonators are disposed on a common optical axial line.

* * * * *